(12) United States Patent
Su et al.

(10) Patent No.: US 6,636,882 B1
(45) Date of Patent: Oct. 21, 2003

(54) MEANS AND METHOD FOR PERFORMING MULTIPLICATION

(75) Inventors: Wei-Ming Su, Taipai (TW); Shin Yung Chen Banyan, Taipei (TW); Yi-Lin Lai, Kee-Lung (TW)

(73) Assignee: Via Technologies, Inc., Taipei (TW)

( * ) Notice: Subject to any disclaimer, the term of this patent is extended or adjusted under 35 U.S.C. 154(b) by 0 days.

(21) Appl. No.: 09/482,623

(22) Filed: Jan. 14, 2000

(30) Foreign Application Priority Data

Apr. 28, 1999 (TW) ........................................ 88106875 A

(51) Int. Cl.[7] ................................................. G06F 7/72
(52) U.S. Cl. ......................................................... 708/492
(58) Field of Search ............................................. 708/492

(56) References Cited

U.S. PATENT DOCUMENTS 5,502,665 A  3/1996  Im ........................... 364/746.1
5,768,168 A * 6/1998  Im .............................. 708/492
6,343,305 B1 * 1/2002  Koç et al. ................... 708/492
6,356,636 B1 * 3/2002  Foster et al. ................. 380/30
6,366,941 B1 * 4/2002  Wolf et al. .................. 708/492

* cited by examiner

*Primary Examiner*—David H. Malzahn
(74) *Attorney, Agent, or Firm*—Rabin & Berdo, P.C.

(57) ABSTRACT

A multiplier for obtaining the product of elements in a Galois Field. The multiplier performs the multiplication of two n-bit elements, $A(a_{n-1}, a_{n-2}, \ldots, a_3, a_2, a_1, a_0)$ and $B(b_{n-1}, b_{n-2}, \ldots, b_3, b_2, b_1, b_0)$ in the Galois Field to yield the product $C(c_{n-1}, c_{n-2}, \ldots, c_3, c_2, c_1, c_0)$, wherein $n \geq 1$ $a_i(i=0\sim n-1)$, $b_j(j=0\sim n-1)$, and $c_k(k=0\sim n-1)$ are all binary bits. The multiplier includes: an AND planer, for performing an AND logic operation of every bit $a_i$ in $A(a_{n-1}, a_{n-2}, \ldots, a_3, a_2, a_1, a_0)$ and every bit $b_j$ in $B(b_{n-1}, b_{n-2}, \ldots, b_3, b_2, b_1, b_0)$ to obtain $(a_{n-1}b_{n-1}, a_{n-1}b_{n-2}, \ldots, a_{n-1}b_0, a_{n-2}b_{n-1}, a_{n-2}b_{n-2}, \ldots, a_{n-2}b_0, a_0b_{n-1}, a_0b_{n-2}, \ldots, a_0b_0)$; and an XOR planer, for performing an XOR logic operation of the output from the AND planer to obtain $C(c_{n-1}, c_{n-2}, \ldots, c_3, c_2, c_1, c_0)$.

6 Claims, 2 Drawing Sheets

MEANS AND METHOD FOR PERFORMING MULTIPLICATION

FIELD OF THE INVENTION

The invention relates in general to a multiplier for obtaining the multiplication product of elements in a Galois Field, and more particularly to a multiplier which effectively yields the product of Galois Field elements by using a combination circuit implementation.

DESCRIPTION OF THE RELATED ART

Conventionally, binary scales are utilized to store and read data in a computer. An 8-bit byte is taken as an example. The byte "00000000" represents the value 0, the byte "00000001" represents the value 1, and similarly, the byte "11111111" represents the value 255. Herein, the symbol $F\{2^8\}$ is used to represent the 8-bit binary field. In the field $F\{2^8\}$, every element represents a byte which corresponds to a value in [0,255] respectively. Moreover, the 8-bit Galois Field is denoted by $GF\{2^8\}$. Every byte in the field $GF\{2^8\}$ can be represented by a value in $\{0, \alpha, \alpha^2, \ldots, \alpha^{255}\}$, respectively, wherein $\alpha$ is "00000010".

The multiplication operation, denoted by "*", of any byte $A$ $(a_7,a_6,a_5,a_4,a_3,a_2,a_1,a_0)$ in $GF\{2^8\}$ and $\alpha$ conventionally follows two steps. First, every bit $b_i$ (i=0~7) of the byte A should be first left-shifted for one bit. Then, according to the Equation (1), the product of $A^*\alpha$ can be obtained.

$$A^*\alpha = (a_6,a_5,a_4,a_3,a_2,a_1,a_0,0) \oplus (0,0,0,a_7,a_7,a_7,0,a_7) \quad (1)$$

While any byte $A$ $(a_7, a_6, a_5, a_4, a_3, a_2, a_1, a_0)$ in $GF\{2^8\}$ is to be multiplied by $\alpha$, the multiplication, denoted by "*", is performed as follows: every bit $b_i$ (i=0~7) in the byte A should be first left-shifted for one bit, and then according to the Equation (1), the value of $A^*\alpha$ can be obtained.

The operator "$\oplus$" in the Equation (1) is an Exclusive OR (XOR) logic operation.

TABLE 1

| A | $A^*\alpha$ |
|---|---|
| 00000001 | 00000010(=$\alpha$) |
| 00000010(=$\alpha$) | 00000100(=$\alpha^2$) |
| . | . |
| . | . |
| 10000000(=$\alpha^7$) | 00011101(=$\alpha^8$) |
| 00011101(=$\alpha^8$) | 00111010(=$\alpha^9$) |
| . | . |
| . | . |
| 11001101(=$\alpha^{12}$) | 10000111(=$\alpha^{13}$) |
| . | . |
| . | . |
| 10000110(=$\alpha^{254}$) | 00000001(=$\alpha^{255}$) |

The result of the above-mentioned multiplication as shown in Table 1 can be obtained, basing on the equation $\alpha^8 = \alpha^4 \oplus \alpha^3 \oplus \alpha^2 \oplus \alpha^0$. Consequently, it is to be understood that $\alpha^2$ is "00000100", ..., $\alpha^7$ is "10000000", and $\alpha^8$ is "00001101".

When the most significant bit (MSB), $b_7$, of the byte A is "1", according to the Equation (1), the value of $A^*\alpha$ is the result of $(a_6,a_5,a_4,a_3,a_2,a_1,a_0,0) \oplus (0,0,0,0,1,1,0,1)$. Thus, $\alpha^9$ is "00111010", ..., $\alpha^{12}$ is "11001101", $\alpha^{13}$ is "10000111", ..., and accordingly, $\alpha^{255}$ is "00000001".

The operation including the steps of left-shifting every bit by one bit and utilizing the XOR logic operation is called a "shift operation."

It is demonstrated that each of the 256 values 0, $\alpha$, $\alpha^2$, ..., $\alpha^{255}$, corresponds to each byte in [0,255], respectively.

Conventionally, the multiplication product of the two elements A, B in $GF\{2^8\}$ is obtained by first expressing the multiplier $B(B\neq 0)$ in the form of $\alpha^n$ ($n=1\neq 255$). Time for finding the value n is assumed to be T. To obtain the product of $A^*B$, the multiplicand A should be multiplied by $\alpha$ n times, and each time, the shift operation mentioned above has to be performed once. Therefore, to multiply A by $\alpha$ n times needs the shift operation to be applied n times. This shift operation takes about one period T. While the value of n is large, such as 250, the shift operation has to be performed 250 times, which takes at long as 250*T. Therefore, the time-consumption is high.

SUMMARY OF THE INVENTION

It is therefore a primary object of the invention to provide a multiplier for obtaining the product of elements in a Galois Field. By applying the features of elements in the Galois Field, and a combination circuit implementation in computer hardware, the product of the multiplication can be quickly obtained.

In order to accomplish the object of the invention, a multiplier for obtaining the product of elements in a Galois Field is proposed. The multiplier performs the multiplication of two n-bit elements $A(a_{n-1}, a_{n-2}, \ldots, a_3, a_2, a_1, a_0)$ and $B(b_{n-1}, b_{n-2}, \ldots, b_3, b_2, b_1, b_0)$ in the Galois Field. Therefore, the product $C=A^*B=(c_{n-1},c_{n-2},\ldots,c_3,c_2,c_1,c_0)$ is obtained, wherein $n \geq 1$ and $a_i$ (i=0~n-1), $b_j$(j=0~n-1), and $c_k$(k=0~n-1) are all binary bits. The multiplier includes an AND planer, that is, a circuit for performing an AND logic operation of every bit $a_i$(i=0~n-1) in $A(a_{n-1}, a_{n-2}, \ldots, a_3, a_2, a_1, a_0)$ and every bit $b_j$(j=0~n-1) in $B(b_{n-1}, b_{n-2}, \ldots, b_3, b_2, b_1, b_0)$ to obtain $(a_{n-1}b_{n-1}, a_{n-1}b_{n-2}, \ldots, a_{n-1}b_0, a_{n-2}b_{n-1}, a_{n-2}b_{n-2}, \ldots, a_{n-2}b_0, a_0b_{n-1}, a_0b_{n-2}, \ldots, a_0b_0)$. The multiplier further includes an XOR planer, that is, a circuit for performing an XOR logic operation of $(a_{n-1}b_{n-1}, a_{n-1}b_{n-2}, \ldots, a_{n-1}b_0, a_{n-2}b_{n-1}, a_{n-2}b_{n-2}, \ldots, a_{n-2}b_0, a_0b_{n-1}, a_0b_{n-2}, \ldots, a_0b_0)$ to obtain $(c_{n-1}, c_{n-2}, \ldots, c_3, c_2, c_1, c_0)$.

As n=8, $c_0 = b_0a_0 \oplus b_1a_7 \oplus b_2a_6 \oplus b_3a_5 \oplus b_4a_4 \oplus b_5a_3 \oplus b_6a_2 \oplus b_7a$
$_1 \oplus b_5a_7 \oplus b_6a_6 \oplus b_7a_5 \oplus b_6a_7 \oplus b_7a_6 \oplus b_7a_7;$ $c_1 = b_0a_1 \oplus b_1a_0 \oplus b_2a_7 \oplus b_3a_6 \oplus b_4a_5 \oplus b_5a_4 \oplus b_6a_3 \oplus b_7a$
$_2 \oplus b_6a_7 \oplus b_7a_6 \oplus b_7a_7;$ $c_2 = b_0a_2 \oplus b_1a_1 \oplus b_2a_0 \oplus b_1a_7 \oplus b_2a_6 \oplus b_3a_5 \oplus b_4a_4 \oplus b_5a$
$\oplus_3 b_6a_2 \oplus b_7a_1 \oplus b_3a_7 \oplus b_4a_6 \oplus b_5a_5 \oplus b_6a_4 \oplus b_7a_3 \oplus b_5a_7$
$\oplus b_6a_6 \oplus b_7a_5 \oplus b_6a_7 \oplus b_7a_6;$ $c_3 = b_0a_3 \oplus b_1a_2 \oplus b_2a_1 \oplus b_3a_0 \oplus b_1a_7 \oplus b_2a_6 \oplus b_3a_5 \oplus b_4a_4$
$\oplus b_5a_3 \oplus b_6a_2$
$\oplus b_7a_1 \oplus b_2a_7 \oplus b_3a_6 \oplus b_4a_5 \oplus b_5a_4 \oplus b_6a_3 \oplus b_7a_2 \oplus b_4a_7 \oplus$
$b_5a_6 \oplus b_6a_5 \oplus b_7a_4 \oplus b_5a_7 \oplus b_6a_6 \oplus b_7a_5;$ $c_4 = b_0a_4 \oplus b_1a_3 \oplus b_2a_2 \oplus b_3a_1 \oplus b_4a_0 \oplus b_1a_7 \oplus b_2a_6 \oplus b_3$
$a_5 \oplus b_4a_4 \oplus b_5a_3 \oplus b_6a_2 \oplus b_7a_1 \oplus b_2a_7 \oplus b_3a_6 \oplus b_4a_5 \oplus b_5a$
$\oplus_4 b_6a_3 \oplus b_7a_2 \oplus b_3a_7 \oplus b_4a_6 \oplus b_5a_5 \oplus b_6a_4 \oplus b_7a_3 \oplus b_7a_7;$ $c_5 = b_0a_5 \oplus b_1a_4 \oplus b_2a_3 \oplus b_3a_2 \oplus b_4a_1 \oplus b_5a_0 \oplus b_2a_7 \oplus b_3a$
$_6 \oplus b_4a_5 \oplus b_5a_4 \oplus b_6a_3 \oplus b_7a_2 \oplus b_3a_7 \oplus b_4a_7 \oplus b_5a_6 \oplus b_6a_5 \oplus$
$b_7a_4 \oplus b_3a_7 \oplus b_4a_6 \oplus b_5a_5 \oplus b_6a_4 \oplus b_7a_3;$ $c_6 = b_0a_6 \oplus b_1a_5 \oplus b_2a_4 \oplus b_3a_3 \oplus b_4a_2 \oplus b_5a_1 \oplus b_6a_0 \oplus b_3a_7$
$\oplus b_4a_6 \oplus b_5a_5$
$\oplus b_6a_4 \oplus b_7a_3 \oplus b_4a_7 \oplus b_5a_6 \oplus b_6a_5 \oplus b_7a_4 \oplus b_5a_7 \oplus b_6a_6 \oplus b_7a_5;$ and $c_7 = b_0a_7 \oplus b_1a_6 \oplus b_2a_5 \oplus b_3a_4 \oplus b_4a_3 \oplus b_5a_2 \oplus b_6a_1 \oplus b_7a_0$
$\oplus b_6a_7 \oplus b_7a_6 \oplus b_4a_7 \oplus b_5a_6 \oplus b_6a_5 \oplus b_7a_4 \oplus b_5a_7 \oplus b_6a_6 \oplus b_7a_5.$ It is therefore another object of the invention to provide a multiplier for data decoding of an audio-video processor. The multiplier performs a multiplication operation of elements in the Galois Field. The multiplier includes a first combination circuit for performing an AND logic operation of the bits of the multipicand and the bits of multiplier to yield another set of bits. The multiplier further includes a second combination circuit, for performing an XOR logic operation of the bits outputted from the first combination circuit to yield the bits of the product.

It is therefore a further object of the invention to provide a multiplication methods of elements in a Galois Field. The method is used for data decoding in an audio-video processor. The method includes a step of performing an AND logic operation of the bits of the multiplicand and the bits of the multiplier to obtain another set of bits and a step of performing an XOR logic operation of the outputted bits to obtain the product.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
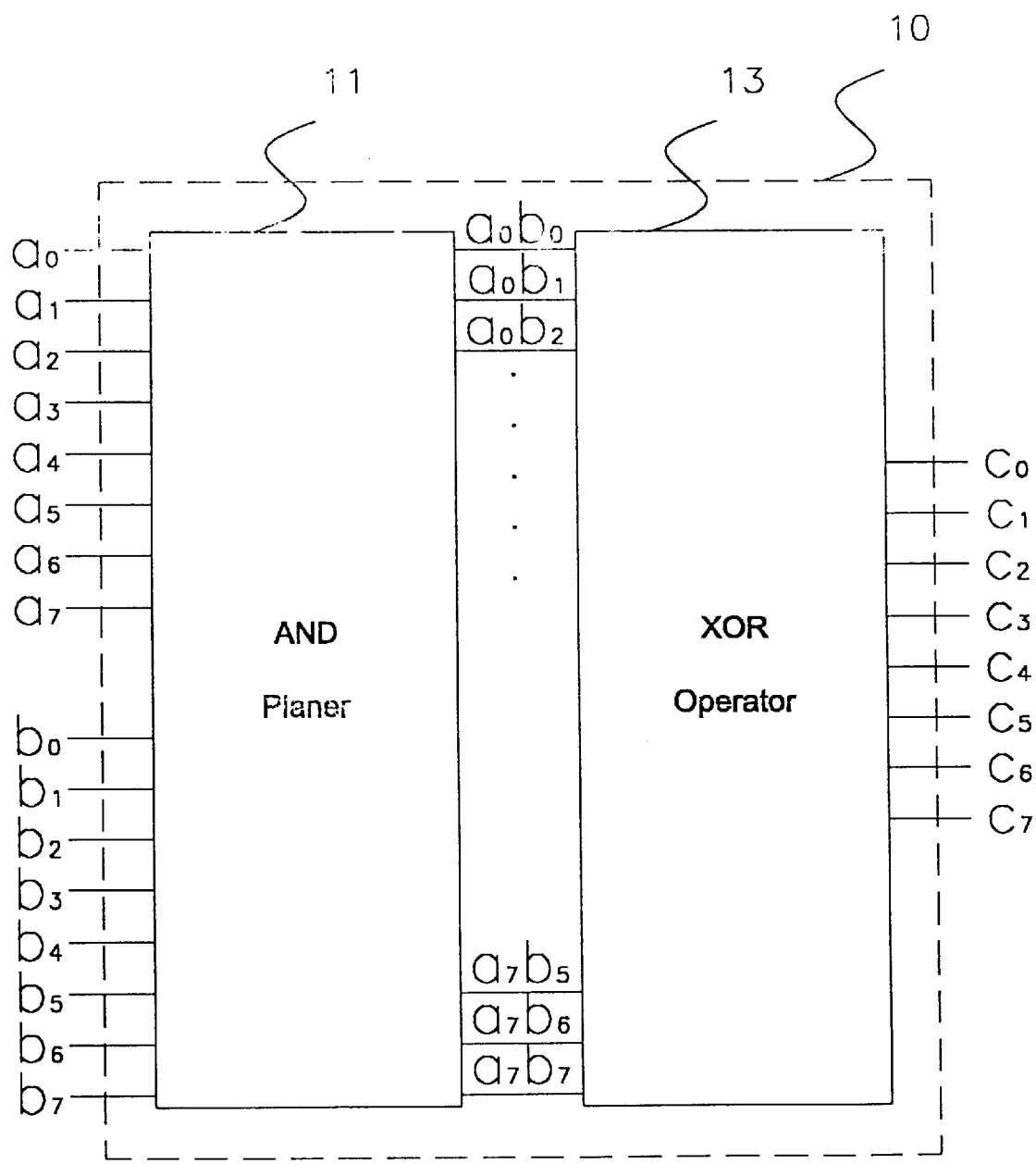
FIG. 1 is a diagram showing a multiplier according to a preferred embodiment of the invention.

The process of how to obtain the coefficients in the multiplication between two elements A, B in $GF\{2^8\}$ is first described.

Two 8-bit elements $A(a_7, a_6, a_5, a_4, a_3, a_2, a_1, a_0)$ and $B(b_7, b_6, b_5, b_4, b_3, b_2, b_1, b_0)$ in $GF\{2^8\}$ are first given, wherein $a_i(i=0\sim7)$ and $b_j(j=0\sim7)$ are all binary bits. The elements A and B can be represented as follows.

$$A=(a_7, a_6, a_5, a_4, a_3, a_2, a_1, a_0)= \\ a_7{}^*\alpha\hat{\;}7 \oplus a_6{}^*\alpha\hat{\;}6 \oplus a_5{}^*\alpha\hat{\;}5 \oplus a_4{}^*\alpha\hat{\;}4 \oplus a_3{}^*\alpha\hat{\;}3 \oplus$$

$$a_2{}^*\alpha\hat{\;}2 \oplus a_1{}^*\alpha\hat{\;}1 \oplus a_0{}^*\alpha\hat{\;}0 \quad (2)$$

$$B=(b_7, b_6, b_5, b_4, b_3, b_2, b_1, b_0)= \\ b_7{}^*\alpha\hat{\;}7 \oplus b_6{}^*\alpha\hat{\;}6 \oplus b_5{}^*\alpha\hat{\;}5 \oplus b_4{}^*\alpha\hat{\;}4 \oplus b_3{}^*\alpha\hat{\;}3 \oplus$$

$$b_2{}^*\alpha\hat{\;}2 \oplus b_1{}^*\alpha\hat{\;}1 \oplus b_0{}^*\alpha\hat{\;}0 \quad (3)$$

wherein $\alpha\hat{\;}0$="00000001"=$\alpha\hat{\;}255$
$\alpha\hat{\;}1$="00000010"
$\alpha\hat{\;}2$="00000100"
$\alpha\hat{\;}3$="00001000"
$\alpha\hat{\;}4$="00010000"
$\alpha\hat{\;}5$="00100000"
$\alpha\hat{\;}6$="01000000"
$\alpha\hat{\;}7$="10000000"

Therefore, the product C of element A multiplied by B can be represented as follows.

$$C=A*B=b_0 a_0{}^*\alpha\hat{\;}0 \oplus (b_0 a_1 \oplus b_1 a_0){}^*\alpha\hat{\;}1 \oplus$$

$$(b_0 a_2 \oplus b_1 a_1 \oplus b_2 a_0){}^*\alpha\hat{\;}2 \oplus$$

$$(b_0 a_3 \oplus b_1 a_2 \oplus b_2 a_1 \oplus b_3 a_0){}^*\alpha\hat{\;}3 \oplus$$

$$(b_0 a_4 \oplus b_1 a_3 \oplus b_2 a_2 \oplus b_3 a_1 \oplus b_4 a_0){}^*\alpha\hat{\;}4 \oplus$$

$$(b_0 a_5 \oplus b_1 a_4 \oplus b_2 a_3 \oplus b_3 a_2 \oplus b_4 a_1 \oplus b_5 a_0){}^*\alpha\hat{\;}5 \oplus$$

$$(b_0 a_6 \oplus b_1 a_5 \oplus b_2 a_4 \oplus b_3 a_3 \oplus b_4 a_2 \oplus b_5 a_1 \oplus b_6 a_0){}^*\alpha\hat{\;}6 \oplus$$

$$(b_0 a_7 \oplus b_1 a_6 \oplus b_2 a_5 \oplus b_3 a_4 \oplus b_4 a_3 \oplus b_5 a_2 \oplus b_6 a_1 \oplus b_7 a_0){}^*\alpha\hat{\;}7 \oplus$$

$$(b_1 a_7 \oplus b_2 a_6 \oplus b_3 a_5 \oplus b_4 a_4 \oplus b_5 a_3 \oplus b_6 a_2 \oplus b_7 a_1){}^*\alpha\hat{\;}8 \oplus$$

$$(b_2 a_7 \oplus b_3 a_6 \oplus b_4 a_5 \oplus b_5 a_4 \oplus b_6 a_3 \oplus b_7 a_2){}^*\alpha\hat{\;}9 \oplus$$

$$(b_3 a_7 \oplus b_4 a_6 \oplus b_5 a_5 \oplus b_6 a_4 \oplus b_7 a_3){}^*\alpha\hat{\;}10 \oplus$$

$$(b_4 a_7 \oplus b_5 a_6 \oplus b_6 a_5 \oplus b_7 a_4){}^*\alpha\hat{\;}11 \oplus$$

$$(b_5 a_7 \oplus b_6 a_6 \oplus b_7 a_5){}^*\alpha\hat{\;}12 \oplus$$

$$(b_6 a_7 \oplus b_7 a_6){}^*\alpha\hat{\;}13 \oplus$$

$$b_7 a_7 {}^*\alpha\hat{\;}14 \quad (4)$$

Continuously, as shown in Equations (5)~(11), $\alpha\hat{\;}8$, $\alpha\hat{\;}9$, $\alpha\hat{\;}10$, $\alpha\hat{\;}11$, $\alpha\hat{\;}12$, $\alpha\hat{\;}13$, and $\alpha\hat{\;}14$ can be represented by the combination of $\alpha\hat{\;}0$, $\alpha\hat{\;}1$, $\alpha\hat{\;}2$, $\alpha\hat{\;}3$, $\alpha\hat{\;}4$, $\alpha\hat{\;}5$, $\alpha\hat{\;}6$, and $\alpha\hat{\;}7$.

$$\alpha\hat{\;}8 = \alpha\hat{\;}4 \oplus \alpha\hat{\;}3 \oplus \alpha\hat{\;}2 \oplus \alpha\hat{\;}0 \quad (5)$$

$$\alpha\hat{\;}9 = \alpha\hat{\;}5 \oplus \alpha\hat{\;}4 \oplus \alpha\hat{\;}3 \oplus \alpha\hat{\;}1 \quad (6)$$

$$\alpha\hat{\;}10 = \alpha\hat{\;}6 \oplus \alpha\hat{\;}5 \oplus \alpha\hat{\;}4 \oplus \alpha\hat{\;}2 \quad (7)$$

$$\alpha\hat{\;}11 = \alpha\hat{\;}7 \oplus \alpha\hat{\;}6 \oplus \alpha\hat{\;}5 \oplus \alpha\hat{\;}3 \quad (8)$$

$$\alpha\hat{\;}12 = \alpha\hat{\;}7 \oplus \alpha\hat{\;}6 \oplus \alpha\hat{\;}3 \oplus \alpha\hat{\;}2 \oplus \alpha\hat{\;}0 \quad (9)$$

$$\alpha\hat{\;}13 = \alpha\hat{\;}7 \oplus \alpha\hat{\;}2 \oplus \alpha\hat{\;}1 \oplus \alpha\hat{\;}0 \quad (10)$$

$$\alpha\hat{\;}14 = \alpha\hat{\;}4 \oplus \alpha\hat{\;}1 \oplus \alpha\hat{\;}0 \quad (11)$$

Moreover, according to Equations (5)~(11), the Equation (4) can be converted and the value C can be represented by the combination of $\alpha\hat{\;}0$, $\alpha\hat{\;}1$, $\alpha\hat{\;}2$, $\alpha\hat{\;}3$, $\alpha\hat{\;}4$, $\alpha\hat{\;}5$, $\alpha\hat{\;}6$, and $\alpha\hat{\;}7$, which is as follows, $$C = c_7{}^*\alpha\hat{\;}7 \oplus c_6{}^*\alpha\hat{\;}6 \oplus c_5{}^*\alpha\hat{\;}5 \oplus c_4{}^*\alpha\hat{\;}4 \oplus c_3{}^*\alpha\hat{\;}3 \oplus c_2{}^*\alpha\hat{\;}2 \oplus c_1{}^*\alpha\hat{\;}1 \oplus c_0{}^*\alpha\hat{\;}$$

$$= (c_7, c_6, c_5, c_4, c_3, c_2, c_1, c_0),$$

wherein the coefficients $c_k$ ($k=0\sim7$) are all binary bits, and can be obtained by Equations (12)~(19). Notice that the symbol "$\oplus$" in all Equations listed above is an XOR logic operator.

$$c_0 = b_0 a_0 \oplus b_1 a_7 \oplus b_2 a_6 \oplus b_3 a_5 \oplus b_4 a_4 \oplus b_5 a_3 \oplus b_6 a_2 \oplus b_7 a_1 \oplus b_5 a_7 \oplus b_6$$
$$a_6 \oplus b_7 a_5 \oplus b_6 a_7 \oplus b_7 a_6 \oplus b_7 a_7 \quad (12)$$

$$c_1 = b_0 a_1 \oplus b_1 a_0 \oplus b_2 a_7 \oplus b_3 a_6 \oplus b_4 a_5 \oplus b_5 a_4 \oplus b_6 a_3 \oplus b_7 a_2 \oplus b_6 a_7 \oplus b$$
$$7 a_6 \oplus b_7 a_7 \quad (13)$$

$$c_2 = b_0 a_2 \oplus b_1 a_1 \oplus b_2 a_0 \oplus b_1 a_7 \oplus b_2 a_6 \oplus b_3 a_5 \oplus b_4 a_4 \oplus b_5 a_3 \oplus b_6 a_2 \oplus b$$
$$7 a_1 \oplus$$

$$b_3 a_7 \oplus b_4 a_6 \oplus b_5 a_5 \oplus b_6 a_4 \oplus b_7 a_3 \oplus b_5 a_7 \oplus b_6 a_6 \oplus b_7 a_5 \oplus b_6 a_7 \oplus b_7 a_6 \quad (14)$$

$$c_3 = b_0 a_3 \oplus b_1 a_2 \oplus b_2 a_1 \oplus b_3 a_0 \oplus b_1 a_7 \oplus b_2 a_6 \oplus b_3 a_5 \oplus b_4 a_4 \oplus b_5 a_3 \oplus b$$
$$6 a_2 \oplus$$

$$b_7 a_1 \oplus b_2 a_7 \oplus b_3 a_6 \oplus b_4 a_5 \oplus b_5 a_4 \oplus b_6 a_3 \oplus b_7 a_2 \oplus b_4 a_7 \oplus b_5 a_6 \oplus b_6 a_5$$
$$\oplus b_7 a_4 \oplus b_5 a_7 \oplus b_6 a_6 \oplus b_7 a_5 \quad (15)$$

$$c_4 = b_0 a_4 \oplus b_1 a_3 \oplus b_2 a_2 \oplus b_3 a_1 \oplus b_4 a_0 \oplus b_1 a_7 \oplus b_2 a_6 \oplus b_3 a_5 \oplus b_4 a_4 \oplus b_5 a_3 \oplus$$

$$b_6 a_2 \oplus b_7 a_1 \oplus b_2 a_7 \oplus b_3 a_6 \oplus b_4 a_5 \oplus b_5 a_4 \oplus b_6 a_3 \oplus b_7 a_2 \oplus b_3 a_7 \oplus b_4 a_6$$
$$\oplus b_5 a_5 \oplus b_5 a_4 \oplus b_7 a_3 \oplus b_7 a_7 \quad (16)$$

$$c_5 = b_0 a_5 \oplus b_1 a_4 \oplus b_2 a_3 \oplus b_3 a_2 \oplus b_4 a_1 \oplus b_5 a_0 \oplus b_2 a_7 \oplus b_3 a_6 \oplus b_4 a_5 \oplus b_5 a_4 \oplus$$

$$b_6 a_3 \oplus b_7 a_2 \oplus b_3 a_7 \oplus b_4 a_7 \oplus b_5 a_6 \oplus b_6 a_5 \oplus b_7 a_5 \oplus b_7 a_4 \oplus b_3 a_7 \oplus b_4 a_6$$
$$\oplus b_5 a_5 \oplus b_6 a_4 \oplus b_7 a_3 \quad (17)$$

$$c_6 = b_0 a_6 \oplus b_1 a_5 \oplus b_2 a_4 \oplus b_3 a_3 \oplus b_4 a_2 \oplus b_5 a_1 \oplus b_6 a_0 \oplus b_3 a_7 \oplus b_4 a_6 \oplus b_5 a_5 \oplus$$

$$b_6 a_4 \oplus b_7 a_3 \oplus b_4 a_7 \oplus b_5 a_6 \oplus b_6 a_5 \oplus b_7 a_4 \oplus b_5 a_7 \oplus b_6 a_6 \oplus b_7 a_5 \quad (18)$$

$c_7=b_0a_7 \oplus b_1a_6 \oplus b_2a_5 \oplus b_3a_4 \oplus b_4a_3 \oplus b_5a_2 \oplus b_6a_1 \oplus b_7a_0 \oplus b_6a_7 \oplus b_7a_6 \oplus b_4a_7 \oplus b_5a_6 \oplus b_6a_5 \oplus b_7a_4 \oplus b_5a_7 \oplus b_6a_6 \oplus b_7a_5$ (19)

According to FIG. 1, which is a diagram of a multiplier based on a preferred embodiment of the invention. According to a preferred embodiment of the invention, a multiplier used to obtain the product of the 8-bit-element in the Galois Field is taken as an example. However, a multiplier for yielding the product of the n-bit (n≧1) elements is also within the scope of the invention.

According to a preferred embodiment of the invention, a multiplier 10 is disclosed. The multiplier 10 includes an AND planer 11, and an XOR planer 13. The AND planer 11 includes a number of AND Gates. The AND planer 11 is input by bits $a_i(i=0\sim7)$ in one element $A(a_7, a_6, a_5, a_4, a_3, a_2, a_1, a_0)$, and bits $b_j(j=0\sim7)$ in another element $B(b_7, b_6, b_5, b_4, b_3, b_2, b_1, b_0)$. The XOR planer 13 has a number of XOR Gates, which outputs an element $C(c_7, c_6, c_5, c_4, c_3, c_2, c_1, c_0)$.

In order to obtain the product of the two elements $A(a_7, a_6, a_5, a_4, a_3, a_2, a_1, a_0)$ and $B(b_7, b_6, b_5, b_4, b_3, b_2, b_1, b_0)$ in $GF\{2^8\}$, and AND logic operation of the bits $a_i(i=0\sim7)$ and $b_j(j=0\sim7)$, using the AND planer 11, is first performed. 64 output values $b_0a_0, b_0a_1, \ldots, b_0a_7, b_1a_0, b_1a_1, \ldots, b_1a_7, b_2a_0, b_2a_1, \ldots,$ and $b_2a_7$ can be therefore obtained.

Next, by inputting the above-mentioned 64 values to the XOR planer 13 which is especially set for 8-bit elements, the values of $c_7, c_6, c_5, c_4, c_3, c_2, c_1, c_0$ can be obtained. Thus, the value of C is known and the product of A*B is yielded.

As shown in Equation (13), in order to obtain the value of $c_1$, first, the values of $b_0a_1, b_1a_0, b_2a_7, b_3a_6, b_4a_5, b_5a_4, b_6a_3, b_7a_2, b_6a_7, b_7a_6$, and $b_7a_7$ needed to be found and then the XOR logic operation of the 11 values has to be then performed.

Figure 2:
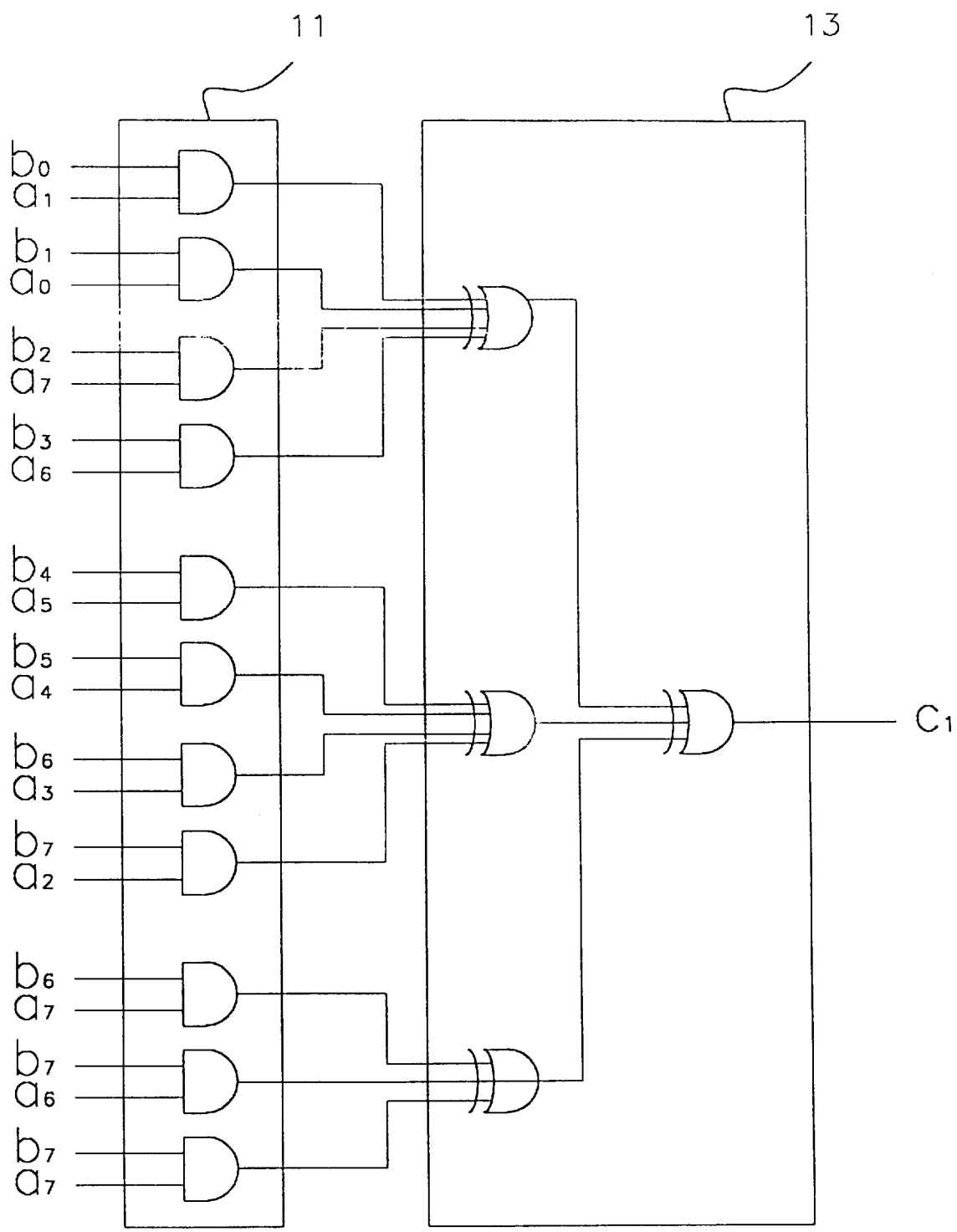
FIG. 2 is a partial logic circuit diagram of the multiplier according to a preferred embodiment of the invention.

Referring to FIG. 2, an AND logic operation on each couples of $(b_0, a_1);(b_1, a_0);b_2, a_7);(b_3, a_6);(b_4, a_5); (b_5, a_4); (b_6, a_3);(b_7, a_2);(b_6, a_7);(b_7, a_6);(b_7, a_7)$ is first performed to yield the values of $b_0a_1, b_1a_0, b_2a_7, b_3a_6, b_4a_5, b_5a_4, b_6a_3, b_7a_2, b_6a_7, b_7a_6$, and $b_7a_7$ from the output of the AND planer 11.

Next, in the XOR planer 13, an XOR logic operation of $b_0a_1, b_1a_0, b_2a_7, b_3a_6, b_4a_5, b_5a_4, b_6a_3, b_7a_2, b_6a_7, b_7a_6,$ and $b_7a_7$ is performed to obtain the value $c_1$.

The multiplier and the method according to the invention for obtaining the product of Galois Field elements can be also applied to data decoding in the audio-video processor, such as a compact disk read only memory (CD-ROM) drive.

The characteristics of the invention lie on utilizing the features that every element in $GF\{2^8\}$ can be expressed by the exponent/exponential numbers of the byte α. In addition, a combined logic operation including AND and XOR operations at a computer hardware is then performed. Therefore, the product of any two elements can be simply obtained by inputting the bit value and performing the above-mentioned combined logic operation. And this process takes only one about cycle time T.

If 0.35 μm Complementary Metal Oxide Semiconductor Field Effect Transistor (CMOSFET) is used as the device for logic gates, the above-mentioned combination logic circuit needs about 250 to 350 logic gates. The span of one period T is about 4 nano seconds. Therefore, the means and the method of the invention is much less time-consuming than the conventional ones.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multiplier, for data decoding of an audio-video processor, which performs a multiplication operation of a first element and a second element in Galois Field to obtain a third element, wherein the first element has a plurality of first bits, the second element has a plurality of second bits, and the third element has a plurality of third bits, and wherein the multiplier comprises:

a first combination circuit, for performing an AND logic operation of the first bits and the second bits to obtain a plurality of fourth bits; and a second combination circuit, for performing an exclusive or (XOR) logic operation of the fourth bits outputted from the first combination circuit to yield the third bits;

wherein the multiplier takes substantially one cycle time to perform the AND logic operation and the XOR logic operation to yield the third bits;

wherein each of the first element, the second element and the third element has n bits; the first bits are represented by $(a_{n-1}, a_{n-2}, a_{n-3}, \ldots, a_4, a_3, a_2, a_1, a_0)$, and $a_i$ (i=0~n-1) is a binary bit; the second bits are represented by $(b_{n-1}, b_{n-2}, b_{n-3}, \ldots, b_4, b_3, b_2, b_1, b_0)$, and $b_j$(j=0~n-1) is a binary bit; the third bits are represented by $(c_{n-1}, c_{n-2}, c_{n-3}, \ldots, c_4, c_3, c_2, c_1, c_0)$, and $c_k$(k=0~n-1) is a binary bit; the fourth bits are represented by $(a_{n-1}b_{n-1}, a_{n-1}b_{n-2}, \ldots, a_{n-1}b_0, a_{n-2}b_{n-1}, a_{n-2}b_{n-2}, \ldots, a_{n-2}b_0, a_0b_{n-1}, a_0b_{n-2}, \ldots, a_0b_0)$, and $a_ib_j$(i=0~n-1, j=0~n-1) is a binary bit;

wherein n is equal to 8; and wherein:

$c_0=b_0a_0 \oplus b_1a_7 \oplus b_2a_6 \oplus b_3a_5 \oplus b_4a_4 \oplus b_5a_3 \oplus b_6a_2 \oplus b_7a_1 \oplus b_5a_7 \oplus b_6a_6 \oplus b_7a_5 \oplus b_6a_7 \oplus b_7a_6 \oplus b_7a_7$;

$c_1=b_0a_1 \oplus b_1a_0 \oplus b_2a_7 \oplus b_3a_6 \oplus b_4a_5 \oplus b_5a_4 \oplus b_6a_3 \oplus b_7a_2 \oplus b_6a_7 \oplus b_7a_6 \oplus b_7a_7$;

$c_2=b_0a_2 \oplus b_1a_1 \oplus b_2a_0 \oplus b_1a_7 \oplus b_2a_6 \oplus b_3a_5 \oplus b_4a_4 \oplus b_5a_3 \oplus b_6a_2 \oplus b_7a_1 \oplus b_3a_7 \oplus b_4a_6 \oplus b_5a_5 \oplus b_6a_4 \oplus b_7a_3 \oplus b_5a_7 \oplus b_6a_6 \oplus b_7a_5 \oplus b_6a_7 \oplus b_7a_6$;

$c_3=b_0a_3 \oplus b_1a_2 \oplus b_2a_1 \oplus b_3a_0 \oplus b_1a_7 \oplus b_2a_6 \oplus b_3a_5 \oplus b_4a_4 \oplus b_5a_3 \oplus b_6a_2 \oplus b_7a_1 \oplus b_2a_7 \oplus b_3a_6 \oplus b_4a_5 \oplus b_5a_4 \oplus b_6a_3 \oplus b_7a_2 \oplus b_4a_7 \oplus b_5a_6 \oplus b_6a_5 \oplus b_7a_4 \oplus b_5a_7 \oplus b_6a_6 \oplus b_7a_5$;

$c_4=b_0a_4 \oplus b_1a_3 \oplus b_2a_2 \oplus b_3a_1 \oplus b_4a_0 \oplus b_1a_7 \oplus b_2a_6 \oplus b_3a_5 \oplus b_4a_4 \oplus b_5a_3 \oplus b_6a_2 \oplus b_7a_1 \oplus b_2a_7 \oplus b_3a_6 \oplus b_4a_5 \oplus b_5a_4 \oplus b_6a_3 \oplus b_7a_2 \oplus b_3a_7 \oplus b_4a_6 \oplus b_5a_5 \oplus b_6a_4 \oplus b_7a_3 \oplus b_7a_7$;

$c_5=b_0a_5 \oplus b_1a_4 \oplus b_2a_3 \oplus b_3a_2 \oplus b_4a_1 \oplus b_5a_0 \oplus b_2a_7 \oplus b_3a_6 \oplus b_4a_5 \oplus b_5a_4 \oplus b_6a_3 \oplus b_7a_2 \oplus b_3a_7 \oplus b_4a_6 \oplus b_5a_5 \oplus b_6a_4 \oplus b_7a_3$;

$c_6=b_0a_6 \oplus b_1a_5 \oplus b_2a_4 \oplus b_3a_3 \oplus b_4a_2 \oplus b_5a_1 \oplus b_6a_0 \oplus b_3a_7 \oplus b_4a_6 \oplus b_5a_5 \oplus b_6a_4 \oplus b_7a_3 \oplus b_4a_7 \oplus b_5a_6 \oplus b_6a_5 \oplus b_7a_4 \oplus b_5a_7 \oplus b_6a_6 \oplus b_7a_5$; and $c_7=b_0a_7 \oplus b_1a_6 \oplus b_2a_5 \oplus b_3a_4 \oplus b_4a_3 \oplus b_5a_2 \oplus b_6a_1 \oplus b_7a_0 \oplus b_6a_7 \oplus b_7a_6 \oplus b_4a_7 \oplus b_5a_6 \oplus b_6a_5 \oplus b_7a_4 \oplus b_5a_7 \oplus b_6a_6 \oplus b_7a_5$.

2. A multiplier according to claim 1, wherein the first combination circuit is an AND planer.

3. A multiplier according to claim 1, wherein the second combination circuit is an XOR planer.

4. A multiplier according to claim 1, wherein the audio-video processor is a compact disk read only memory (CD-ROM) drive.

5. A method for obtaining a product of elements in Galois Field, wherein the method is used for data decoding in an audio-video processor, wherein the method is for multiplying a first element in the Galois Field by a second element in Galois Field to obtain a third element, wherein the first element has a plurality of first bits, the second element has a plurality of second bits, and the third element has a plurality of third bits, the method comprising:

performing an AND logic operation of the first bits and the second bits to obtain a plurality of fourth bits; and performing an XOR logic operation of the fourth bits to obtain the third bits;

wherein substantially one cycle time is taken to perform the AND logic operation and the XOR logic operation to obtain the third bits;

wherein each of the first element, the second element and the third element has n bits; the first bits are represented by $(a_{n-1}, a_{n-2}, a_{n-3}, \cdots, a_4, a_3, a_2, a_1, a_0)$, and $a_i$ $(i=0\sim n-1)$ is a binary bit; the second bits are represented by $(b_{n-1}, b_{n-2}, b_{n-3}, \cdots, b_4, b_3, b_2, b_1, b_0)$, and $b_j(j=0\sim n-1)$ is a binary bit; the third bits are represented by $(c_{n-1}, c_{n-2}, c_{n-3}, \cdots, c_4, c_3, c_2, c_1, c_0)$, and $c_k(k=0\sim n-1)$ is a binary bit; the fourth bits are represented by $(a_{n-1} b_{n-1}, a_{n-1}b_{n-2}, \cdots, a_{n-1}b_0, a_{n-2}b_{n-1}, a_{n-2}b_{n-2}, \cdots, a_{n-2}b_0, a_0b_{n-1}, a_0b_{n-2}, \cdots, a_0b_0)$, and $a_ib_j(i=0\sim n-1, j=0\sim n-1)$ is a binary bit;

wherein n is equal to 8; and wherein:

$c_0 = b_0a_0 \oplus b_1a_7 \oplus b_2a_6 \oplus b_3a_5 \oplus b_4a_4 \oplus b_5a_3 \oplus b_6a_2 \oplus b_7a_1 \oplus b_5a_7 \oplus b_6a_6 \oplus b_7a_5 \oplus b_6a_7 \oplus b_7a_6 \oplus b_7a_7;$ $c_1 = b_0a_1 \oplus b_1a_0 \oplus b_2a_7 \oplus b_3a_6 \oplus b_4a_5 \oplus b_5a_4 \oplus b_6a_3 \oplus b_7a_2 \oplus b_6a_7 \oplus b_7a_6 \oplus b_7a_7;$ $c_2 = b_0a_2 \oplus b_1a_1 \oplus b_2a_0 \oplus b_1a_7 \oplus b_2a_6 \oplus b_3a_5 \oplus b_4a_4 \oplus b_5a_3 \oplus b_6a_2 \oplus b_7a_1 \oplus b_3a_7 \oplus b_4a_6 \oplus b_5a_5 \oplus b_6a_4 \oplus b_7a_3 \oplus b_5a_7 \oplus b_6a_6 \oplus b_7a_5 \oplus b_6a_7 \oplus b_7a_6;$ $c_3 = b_0a_3 \oplus b_1a_2 \oplus b_2a_1 \oplus b_3a_0 \oplus b_1a_7 \oplus b_2a_6 \oplus b_3a_5 \oplus b_4a_4 \oplus b_5a_3 \oplus b_6a_2 \oplus b_7a_1 \oplus b_2a_7 \oplus b_3a_6 \oplus b_4a_5 \oplus b_5a_4 \oplus b_6a_3 \oplus b_7a_2 \oplus b_4a_7 \oplus b_5a_6 \oplus b_6a_5 \oplus b_7a_4 \oplus b_5a_7 \oplus b_6a_6 \oplus b_7a_5;$ $c_4 = b_0a_4 \oplus b_1a_3 \oplus b_2a_2 \oplus b_3a_1 \oplus b_4a_0 \oplus b_1a_7 \oplus b_2a_6 \oplus b_3a_5 \oplus b_4a_4 \oplus b_5a_3 \oplus b_6a_2 \oplus b_7a_1 \oplus b_2a_7 \oplus b_3a_6 \oplus b_4a_5 \oplus b_5a_4 \oplus b_6a_3 \oplus b_7a_2 \oplus b_3a_7 \oplus b_4a_6 \oplus b_5a_5 \oplus b_6a_4 \oplus b_7a_3 \oplus b_7a_7;$ $c_5 = b_0a_5 \oplus b_1a_4 \oplus b_2a_3 \oplus b_3a_2 \oplus b_4a_1 \oplus b_5a_0 \oplus b_2a_7 \oplus b_3a_6 \oplus b_4a_5 \oplus b_5a_4 \oplus b_6a_3 \oplus b_7a_2 \oplus b_3a_7 \oplus b_4a_7 \oplus b_5a_6 \oplus b_6a_5 \oplus b_7a_4 \oplus b_3a_7 \oplus b_4a_6 \oplus b_5a_5 \oplus b_6a_4 \oplus b_7a_3;$ $c_6 = b_0a_6 \oplus b_1a_5 \oplus b_2a_4 \oplus b_3a_3 \oplus b_4a_2 \oplus b_5a_1 \oplus b_6a_0 \oplus b_3a_7 \oplus b_4a_6 \oplus b_5a_5 \oplus b_6a_4 \oplus b_7a_3 \oplus b_4a_7 \oplus b_5a_6 \oplus b_6a_5 \oplus b_7a_4 \oplus b_5a_7 \oplus b_6a_6 \oplus b_7a_5;$ and $c_7 = b_0a_7 \oplus b_1a_6 \oplus b_2a_5 \oplus b_3a_4 \oplus b_4a_3 \oplus b_5a_2 \oplus b_6a_1 \oplus b_7a_0 \oplus b_6a_7 \oplus b_7a_6 \oplus b_4a_7 \oplus b_5a_6 \oplus b_6a_5 \oplus b_7a_4 \oplus b_5a_7 \oplus b_6a_6 \oplus b_7a_5.$ 6. A method according to claim 5, wherein the audio-video processor is a compact disk read only memory (CD-ROM) drive.

* * * * *